(12) United States Patent
Jujjuri et al.

(10) Patent No.: US 11,347,774 B2
(45) Date of Patent: May 31, 2022

(54) HIGH AVAILABILITY DATABASE THROUGH DISTRIBUTED STORE

(71) Applicant: salesforce.com, inc., San Francisco, CA (US)

(72) Inventors: Venkateswararao Jujjuri, Beaverton, OR (US); Nathaniel Wyatt, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 549 days.

(21) Appl. No.: 15/666,141

(22) Filed: Aug. 1, 2017

(65) Prior Publication Data

US 2019/0042638 A1    Feb. 7, 2019

(51) Int. Cl.
G06F 16/00 (2019.01)
G06F 16/27 (2019.01)
G06F 16/23 (2019.01)

(52) U.S. Cl.
CPC ........ G06F 16/275 (2019.01); G06F 16/2358 (2019.01); G06F 16/2365 (2019.01)

(58) Field of Classification Search
CPC ............... G06F 16/275; G06F 16/2358; G06F 16/2365; G06F 17/30067; G06F 17/30575; G06F 17/30212; G06F 11/1446; G06F 11/1456
See application file for complete search history.

(56) References Cited

U.S. PATENT DOCUMENTS

| 5,649,089 A | 7/1997 | Kilner |
| 7,734,580 B2 | 6/2010 | Lahiri et al. |
| 7,913,050 B2 | 3/2011 | Bagal et al. |
| 8,145,938 B2 | 3/2012 | Gupta |
| 8,381,017 B2 | 2/2013 | Bae et al. |
| 8,868,504 B2 | 10/2014 | Aranha et al. |
| 9,342,575 B2 | 5/2016 | Alewine et al. |
| 10,235,407 B1 * | 3/2019 | Morkel ............... G06F 16/2315 |

(Continued)

OTHER PUBLICATIONS

Xian-Gang Luo et al, Study on the synchronizing mechanism of node's metadata catalog service, (Jan. 1, 2009), 2009 Second International Workshop on Knowledge Discovery and Data Mining (pp. 877-881) (Year: 2009).*

(Continued)

*Primary Examiner* — Ashish Thomas
*Assistant Examiner* — Suman Rajaputra
(74) *Attorney, Agent, or Firm* — Kowert, Hood, Munyon, Rankin & Goetzel, P.C.

(57) ABSTRACT

Techniques are disclosed relating to a database system synchronizing a current state of the database system among a plurality of nodes configured to handle requests for data of the database system stored in a distributed storage with one of the plurality of nodes being currently active and the other nodes of the plurality of nodes being currently standby nodes. In various embodiments, the active node receives a request to perform a transaction that includes committing data to the distributed storage. In response to receiving the request, in some embodiments, the active node commits the data to the distributed storage to update the current state of the database system and causes storing of metadata that provides an indication of the commitment in a transaction log stored in the distributed storage.

18 Claims, 9 Drawing Sheets

(56) References Cited

U.S. PATENT DOCUMENTS

| | | | | |
|---|---|---|---|---|
| 2014/0324785 A1* | 10/2014 | Gupta | ................. | G06F 16/2358 |
| | | | | 707/689 |
| 2015/0213049 A1* | 7/2015 | Kleiman | ............. | G06F 16/1752 |
| | | | | 707/692 |
| 2018/0322156 A1* | 11/2018 | Lee | ..................... | G06F 16/2343 |
| 2018/0364915 A1* | 12/2018 | Li | ........................ | G06F 12/128 |
| 2019/0384775 A1* | 12/2019 | Wen | .................... | G06F 16/2379 |

OTHER PUBLICATIONS

Invitation to Pay Additional Fees in Appl. No. PCT/US2018/044787 mailed Sep. 25, 2018, 21 pages.
Anonymous: "Polling (computer science),", Wikipedia,Jul. 11, 2017 (Jul. 11, 2017), pp. 1-3, XP055507238, Retrieved from the Internet: URL:https://en.wikipedia.org/w/index.php?title=Polling (computer science)&oldid=790118174—[retrieved on Sep. 14, 2018] p. 1, paragraph 1.
International Search Report and Written Opinion in PCT Appl. No. PCT/US2018/044787 dated Jan. 15, 2019, 25 pages.
Sujoy Paul, Pro SQL Server 2008 Replication, Chapter 18: Optimizing Transactional Replication: Jun. 17, 2009 (Jun. 17, 2009), Apress, XP055534102, ISBN: 978-1-4302-1807-4, pp. 737-800, DOI:10.1007/978-1-4302-1808-1, p. 738, paragraph 5 figures 18-1.

* cited by examiner

HIGH AVAILABILITY DATABASE THROUGH DISTRIBUTED STORE

BACKGROUND

Technical Field

This disclosure relates generally to high availability systems and, more specifically, to clustered database systems.

Description of the Related Art

When an organization wishes to store information for their users, the organization typically implements a database system that stores this information in an organized manner that may be efficiently accessed. Database systems for large enterprise systems may rely on multiple servers to implement a computer cluster, where individual servers act as cluster nodes running an instance of a database application. These nodes may individually service requests from users to operate on data. Since these nodes can be acting in parallel, they may exchange information in order to maintain data coherency across nodes.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, a computer system that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

To maintain data coherency across database nodes, one approach is to have a node directly notify other nodes when it commits transactions to the database. In such an approach, notifications of committed transactions may be conveyed synchronously or asynchronously. In the synchronous approach, a given node notifies the other nodes of each transaction being performed and then waits for a confirmation of receipt from each of the nodes before a transaction is committed. This approach, however, is impractical for high performance applications since the given node spends too much time waiting on confirmations. Also, if any node fails to send a confirmation (e.g., because it crashed), the given node is no longer able to commit any transactions. In the asynchronous approach, a given node notifies the other nodes in periodic batches, but does not wait for receipt confirmations from the other nodes. This approach, however, breaks down if the given node crashes before notifying the other nodes about a new set of committed transactions performed since its last notification.

The present disclosure describes techniques for maintaining metadata coherency across nodes in a manner that overcomes some of the downsides of the prior approaches.

In various embodiments described below, a node writing to a distributed storage sends transaction metadata indirectly to the other nodes via a shared storage in order for them to be aware of the current state of the database system. In such an embodiment, the shared storage stores a transaction log indicating the transactions committed by nodes of the database system and indicating an ordering in which the transactions are committed. Accordingly, a node writing data to the shared storage for a transaction may update the transaction log by appending a record to indicate that the data has been written. Records stored in the transaction log may be reviewed by the other nodes, which may update their local buffer caches to reflect the current state of the database system. To enable tracking newly stored records, in some embodiments, a metadata server may maintain a catalog usable to identify new transaction records that have been written to the shared storage. Accordingly, when a node writes a record for a new transaction to the log, the node may notify the metadata server of the new transaction and its corresponding record in the distributed storage. The metadata server may then store an indication of the record in the catalog. When the other nodes later review the catalog, they can learn of the record from the stored indication and then read the record from the transaction log in order to determine what data has been modified. Synchronizing transaction log information in this manner may be advantageous over the synchronous approach discussed above since the writing node does not need to wait on the other nodes to confirm receipt of transaction log information. Synchronizing transaction log information in this manner may be advantageous over the asynchronous approach noted above as transactions records are recorded as the transactions are being performed—thus, there is less potential for a node to commit a transactions without notifying the other nodes of the transaction.

Figure 1:
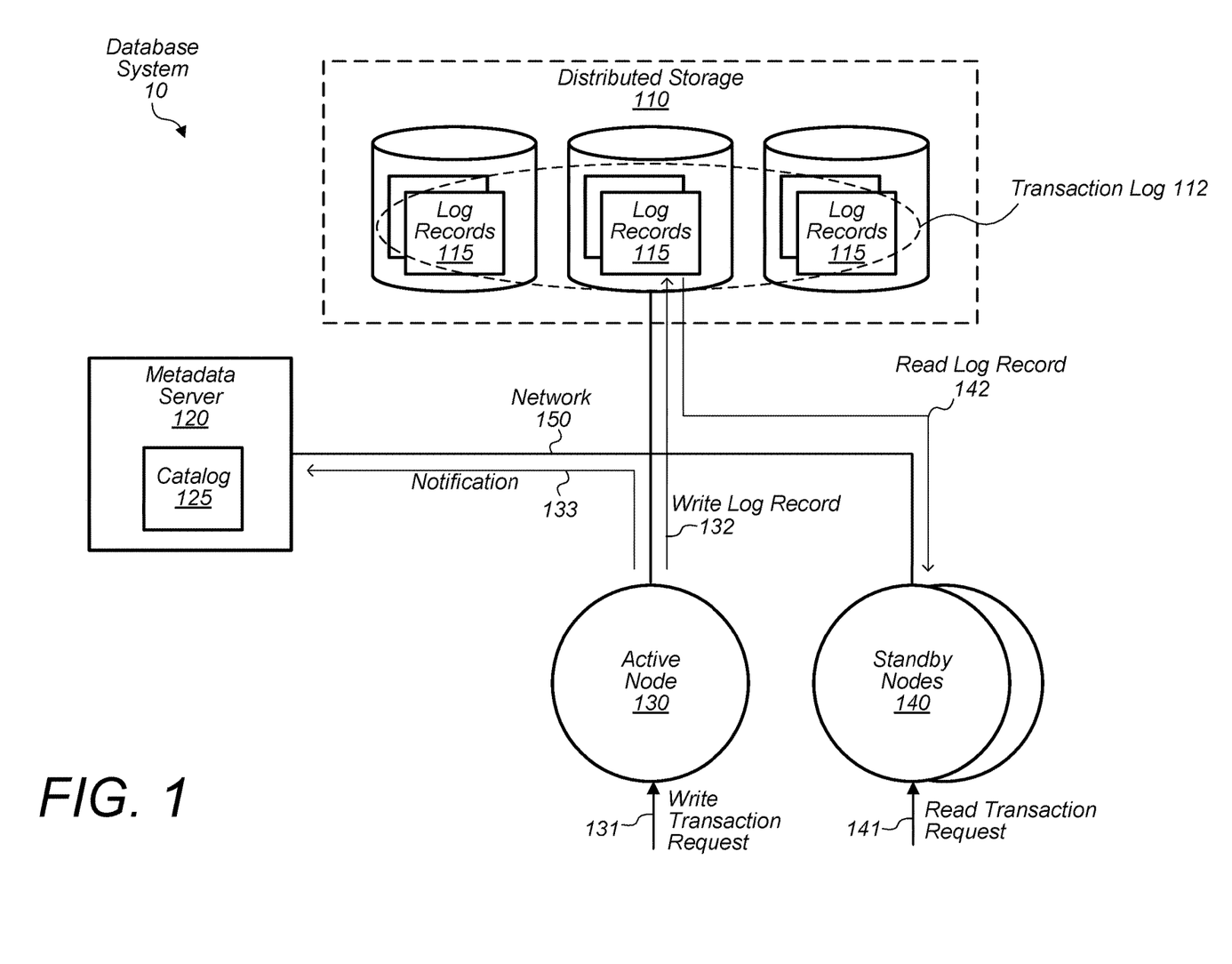
FIG. 1 is a block diagram illustrating exemplary elements of a database system that implement a database, according to some embodiments.

Turning now to FIG. 1, a block diagram of a database system 10 is shown. In the illustrated embodiment, database system 10 includes a distributed storage 110, a metadata server 120, an active node 130, and standby nodes 140 coupled via a network 150. As shown, storage 110 includes log records 115 that together form a transaction log 112, and metadata server 120 includes a catalog 125. Although not shown, multiple client devices may interact with nodes 130 and 140 by sending requests to perform database transactions. In some embodiments, database system 10 may be implemented differently than shown. For example, although a single active node 130 is show in the illustrated embodiment, in some embodiments, database system 10 includes multiple active nodes 130. In some embodiments, metadata server 120 may be implemented as multiple servers storing catalog 125.

Database system 10, in various embodiments, is implemented via nodes 130 and 140, which are configured to operate as a database cluster and process transaction requests 131 and 141 that include reading and/or writing data to distributed storage 110. Accordingly, a node may receive a transaction request 131 to update a user's password to a new value and thus may write the value to distributed storage 110. In various embodiments, database system 10 implements a high availability (HA) service using an active/standby topology in which one or more nodes are elected for writing data to distributed storage 110 on behalf of the other nodes—shown as active node 130.

Implementing an HA service, database system 10 may monitor the health of each node 130 or 140 to determine if any issues or malfunctions occur. If an issue is detected, database system 10 may hold an election to select a new active node 130 for writing data based on active node 130's declining health. As an example, a fan cooling a current active node 130 may stop working, causing the node to overheat and immediately shutdown (or even crash). In such an example, database system 10 may detect that the current active node 130 has become nonresponsive and then promote another node to become active node 130 through an election. In some embodiments, system 10 elects only one node to operate as an active node 130 at any given time.

Distributed storage 110, in some embodiments, is a shared storage configured to store data for users of system 10 and to maintain a transaction log 112 for system 10 that specifies an ordering in which transactions are committed at system 10. Transaction log 112 may include multiple log records 115 that each specify metadata for a respective transaction and may be arranged in the ordering in which the transactions are committed. In some embodiments, sets of records 115 may be stored within files (referred to below as log extents) on storage 110. Distributed storage 110 may be implemented by multiple storage devices connected together over a network and configured to redundantly store data in order to prevent data loss. In various embodiments, distributed storage 110 is accessible to nodes 130 and 140, and is configured to process read and writes requests from these nodes. Storage of transaction log 112 is described in further detail below with respect to FIG. 2.

Metadata server 120, in various embodiments, is configured to maintain various metadata used by nodes 130 and 140 to implement database system 10. For example, as shown, server 120 may maintain a shared database catalog 125, which may specify a schema defining various database structures and objects, indexes for looking up data in the database, users permitted to access database information, etc. In various embodiments, catalog 125 stores information about the allocation of new records 115 by active node 130. This information may be subsequently read from catalog 125 by nodes 140 to determine what records 115 has been allocated and written to by active node 130. Upon learning of these new records 115, nodes 140 may read the records 115 in order to determine the current state of database system 10 and approximately update locally maintained metadata such as updating their local buffer caches having cached data from distributed storage 110. In various embodiments, metadata server 120 receives notifications 133 from active node 130 about records 115 that were recently stored by node 130 at storage 110. In some embodiments, active node 130 sends a notification 133 in response to it allocating a new extent into which records 115 are placed in storage 110. Server 120 is described in further detail below with respect to FIG. 3.

Active node 130, in various embodiments, is configured to service requests to read and write data to distributed storage 110. Accordingly, active node 130 may receive, from a client device, a write transaction request 131 that causes node 130 to write a set of data to storage 110. In response to performing such a transaction, node 130 may store a corresponding log record 115 (shown as write log record 132) for the transaction in transaction log 112 within storage 110. Continuing with the above password example, request 131 may specify a new password to replace a previous one. As a result, in some embodiments, active node 130 may write a transaction record 115 specifying metadata about the transaction such as the key for the user's password field, the previous password, the new password, a timestamp, etc. As noted above, active node 130 may also send a notification 133 to metadata server 120 associated with this newly created record 115. Active node 130 is described below in further detail with respect to FIG. 4A.

Standby nodes 140, in various embodiments, are configured to service requests to provide data stored in distributed storage 110 (or serve as backup nodes that are configured to take over the role of serving requests if warranted). In various embodiments, standby nodes 140 each maintain a local cache storing data, which may also be stored by distributed storage 110 and may be reflective of a current state of database system 10. In such an embodiment, standby nodes 140 receive, from client devices, read transaction requests 141 for data stored in storage 110. In response to these requests, standby nodes 140 may retrieve the requested data from their local caches (as opposed to storage 110) if the data is already present in the cache. In order to ensure that their local caches are concurrent with the data in storage 110, in various embodiments, standby nodes 140 may consult catalog 125 to identify what new records 115 have been added to transaction log 112. These records 115 may then be read from storage 110 to determine any modifications to data in storage 110 that might affect data in their local caches. If data in a local cache is affected (e.g., the value of a key-value pair has been updated or deleted), a standby node 140 may update the cache to reflect the modification of the data in storage 110 (e.g., by updating or invalidating a cache entry). This may allow standby nodes to maintain caches that are reflective of the current state of database system 10. As noted above, one of the standby nodes 140 may be elected to become active node 130—at which point, the node may service write transaction requests 131. Maintaining an up-to-date buffer cache may allow a newly elected node 140 to more quickly take on the role of an active node 130. Standby nodes 140 are described below in further detail with respect to FIG. 4B.

Figure 2:
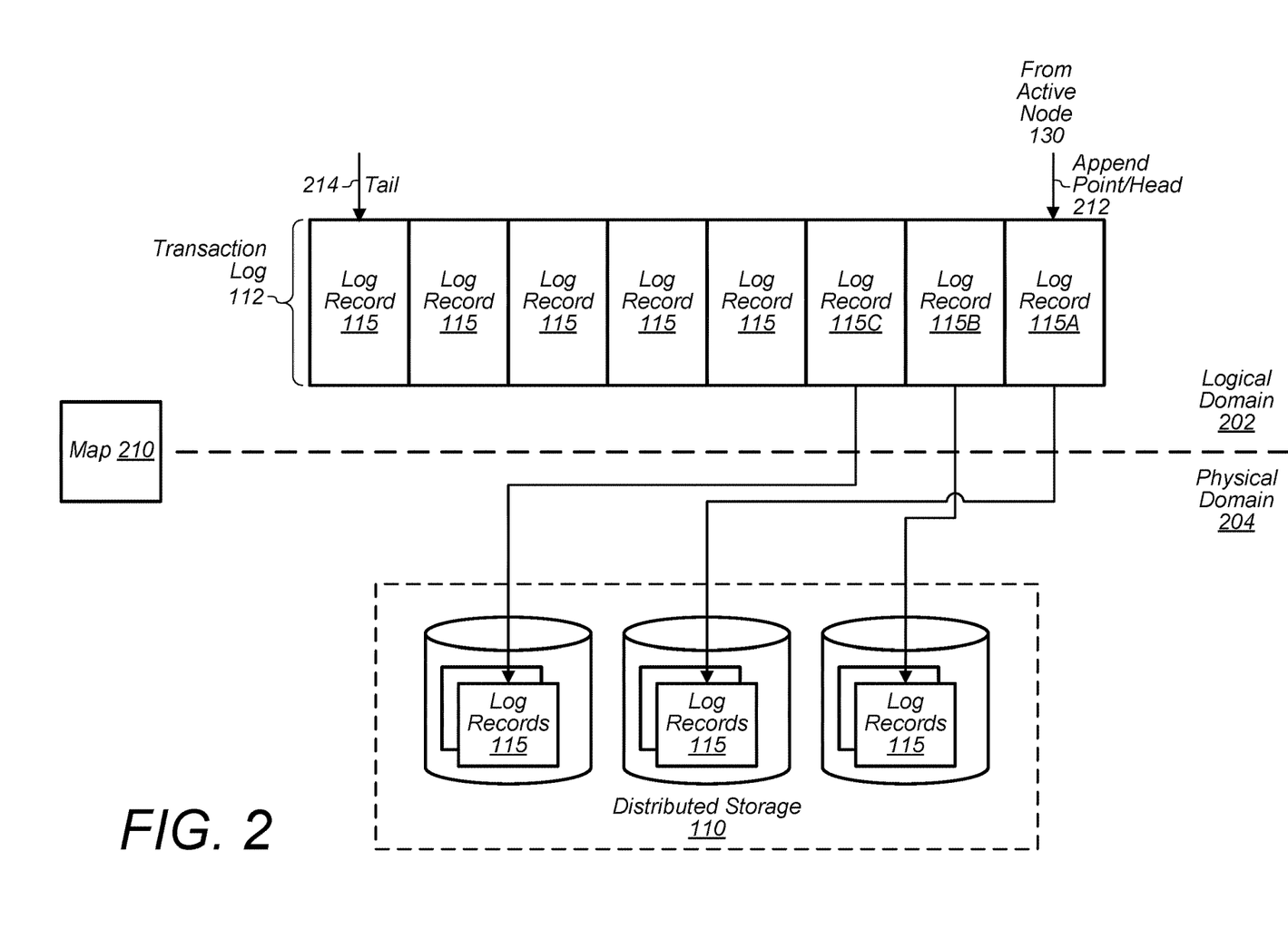
FIG. 2 is a block diagram illustrating exemplary elements of a transaction log in a logical domain and a physical domain, according to some embodiments.

Turning now to FIG. 2, a block diagram of one embodiment of transaction log 112 in a distributed storage 110 is shown. As noted above, in various embodiments, distributed storage 110 includes multiple storage devices that are configured to store data for system 10, including multiple log records 115 that make up transaction log 112. In the illustrated embodiment, a mapping of a logical domain 202 to a physical domain 204 is shown. (In some embodiments, distributed storage 110 may be implemented differently than shown e.g., map 210 may be located at metadata server 120.)

Transaction log 112, as noted above, may maintain a current state of database system 10 and may specify an ordering in which transaction are committed to distributed storage 110 by active node 130. In the illustrated embodiment, logical domain 202 represents the organization of log 112 as log records 115 are added to log 112 over time (and may be the organization perceived by components external to storage 110 such as nodes 130 and 140). To facilitate the storage of records 115, distributed storage 110, in various embodiments, maintains an append point 212 (also referred to as the "head") that specifies where the newest particular record 115 is stored and where to append newer records 115 to the log 112 for committed transactions by active node 130. For example, storage 110 may include a particular log record 115C specifying metadata for an initial transaction updating a user's password from ABC to DEF. At some point, active node 130 may receive a transaction request 131 for updating the password from DEF to GHI and append an additional record 115A to log 112 at append point 212. As additional transactions are stored in storage 110, append point 212 advances to subsequent records 115 in transaction log 112. In some embodiments, storage 110 maintains a tail 214 marker that identifies the oldest record 115 still in use within storage 110. When the oldest record 115 is eventually erased, tail 214 may be advanced forward to the next oldest record 115 in use.

Notably, in the example discussed above, log 112 includes records 115 for both transactions. Storing records 115 in this manner may allow database system 10 to revert back to a particular, previous state of system 10 by "replaying" the log—e.g., starting at head 212 and moving towards the tail 214. Storing in this manner may also allow a standby node 140 to learn how system 10 has changed from a particular point in time (and thus determine the current state of system 10) by starting at the append point 212 and replaying the log 112 to a last read record 115 correspond to that point in time (or starting at the last read record 115 and moving forward towards head 212). Continuing with the above example, a standby node 140 may store, in its local cache, a copy of a key-value pair for the user's password—the value being DEF in response to reading record 115C. When the standby node 140 later learns of record 115A from catalog 125 and reads metadata from record 115A, standby node 140 may update the key-value pair in the local cache so that the value of the user's password is now GHI—and thus the local cache made consistent with the current state of database system 10.

In the illustrated embodiment, physical domain 204 represents the organization of log 112 on the multiple storage devices of storage 110 and may be distinct from the organization in logical domain 202. As shown, for example, records 115A-C of log 112 may be adjacent in the logical domain because they occur sequentially in time, but may be stored in different elements of storage 110 in physical domain 204. (As noted above, in some embodiments, a group of records 115 may be placed into the same log extent—thus, records 115A and 115B may be collocated in the same extent, but record 115C may be included in another extent located elsewhere in storage 110.) As such, storage 110 may also include a map 210 that is usable to locate records 115 in physical domain 204.

Map 210, in various embodiments, maintains a key-value pair mapping that may be used to locate a particular record 115 stored at storage 110 by supplying a corresponding key. When storing records 115 in some embodiments (or allocating a log extent for storing records 115 in another embodiment), storage 110 (or active node 130) updates map 210 with a key and a physical location that are both associated with a newly allocated record 115. When a standby node 140 learns of a key associated with a newly created record 115 from catalog 125, standby nodes 140 may provide the key associated with the record 115 to storage 110, which uses map 210 to determine the physical address where the record is located in storage 110.

In various embodiments, log records 115 include transactional metadata as well as a copy of the actual data operated on; however, database system 10 may also store another copy the data in separate data records. In some embodiments, these data records may be collocated with log records 115. In other embodiments, data records may be located separately and organized in a manner that better facilitates retrieval of data responsive to database queries associated with read transactions requests 141 and/or write transactions requests 131.

Figure 3:
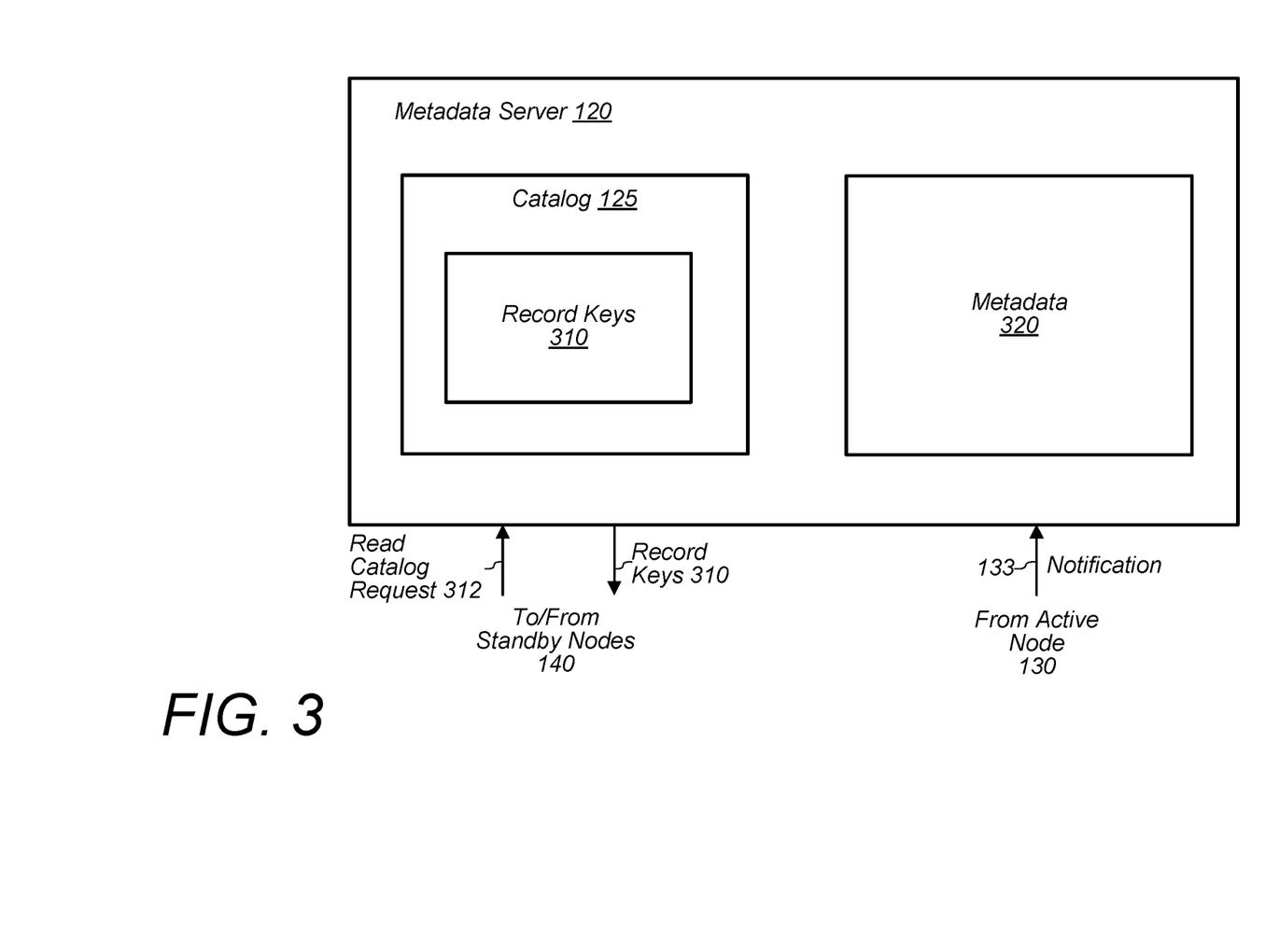
FIG. 3 is a block diagram illustrating exemplary elements of a computer system that maintains a set of keys, according to some embodiments.

Turning now to FIG. 3, a block diagram of one embodiment of metadata server 120 is shown. As mentioned above, in various embodiments, metadata server 120 is configured to maintain metadata about the database cluster and log records 115, and to maintain catalog 125. As such, in the illustrated embodiment, server 120 includes metadata 320 and catalog 125 having record keys 310. As noted above, metadata server 120 may be implemented by multiple servers working in conjunction with each other. In various embodiments, server 120 may be implemented differently than shown—e.g., includes map 210 as described in detail above with respect to FIG. 2.

Catalog 125, in various embodiments, may include any of the various information discussed above as well as be usable to determine records 115 that have been allocated and written to by active node 130. Accordingly, catalog 125 may store keys 310 that are usable to locate particular records 115. For example, keys 310 may be supplied to map 210 in order to receive physical addresses of the associated records 115. In some embodiments, keys 310 may be usable to locate a container (e.g., log extent) that includes one or more log records 315. In various embodiments, server 120 updates catalog 125 with new keys 310 in response to receiving notification 133 from active node 130 about newly allocated records 115. Subsequently, server 120 may notify standby nodes 140 that catalog 125 has been updated. Standby nodes 140 that wish to read newly allocated records 115 may first consult catalog 125 by issuing a read catalog request 312 to metadata server 120 for keys 310. In response to request 312, server 120 may provide one or more keys 310 to the requesting node. In some cases, request 312 may be a request for keys 310 based on a criteria. For example, a standby node 140 may attempt to updates its cache with the latest transaction metadata by issuing request 312 for records 115 that have time stamps satisfying a threshold value.

As noted with respect to FIG. 2, in various embodiments, metadata server 120 may receive additional information from node 130 in response to an allocation of a new record 115. This information may include append point 212 and tail 214 marker. Metadata server 120 may store this information at metadata 330 and provide such information to nodes 130 and 140 in response to a request (not shown). As an example, after becoming active, an active node 130 may need to know the head of log 112 and thus may request point 212 from server 120. In various embodiments, metadata 330 includes time stamps (e.g., creation, modification, etc.) for each entry of catalog 125, a transaction ID for each entry, database schemas, and so on. Server 120 may use this metadata to process requests 312 from nodes 130 and/or 140. As an example, a particular standby node 140 may request a key 310 of particular record 115 and as such, metadata server 120 may use a transaction ID to determine the record 115 and subsequently the key 310.

Figure 4A:
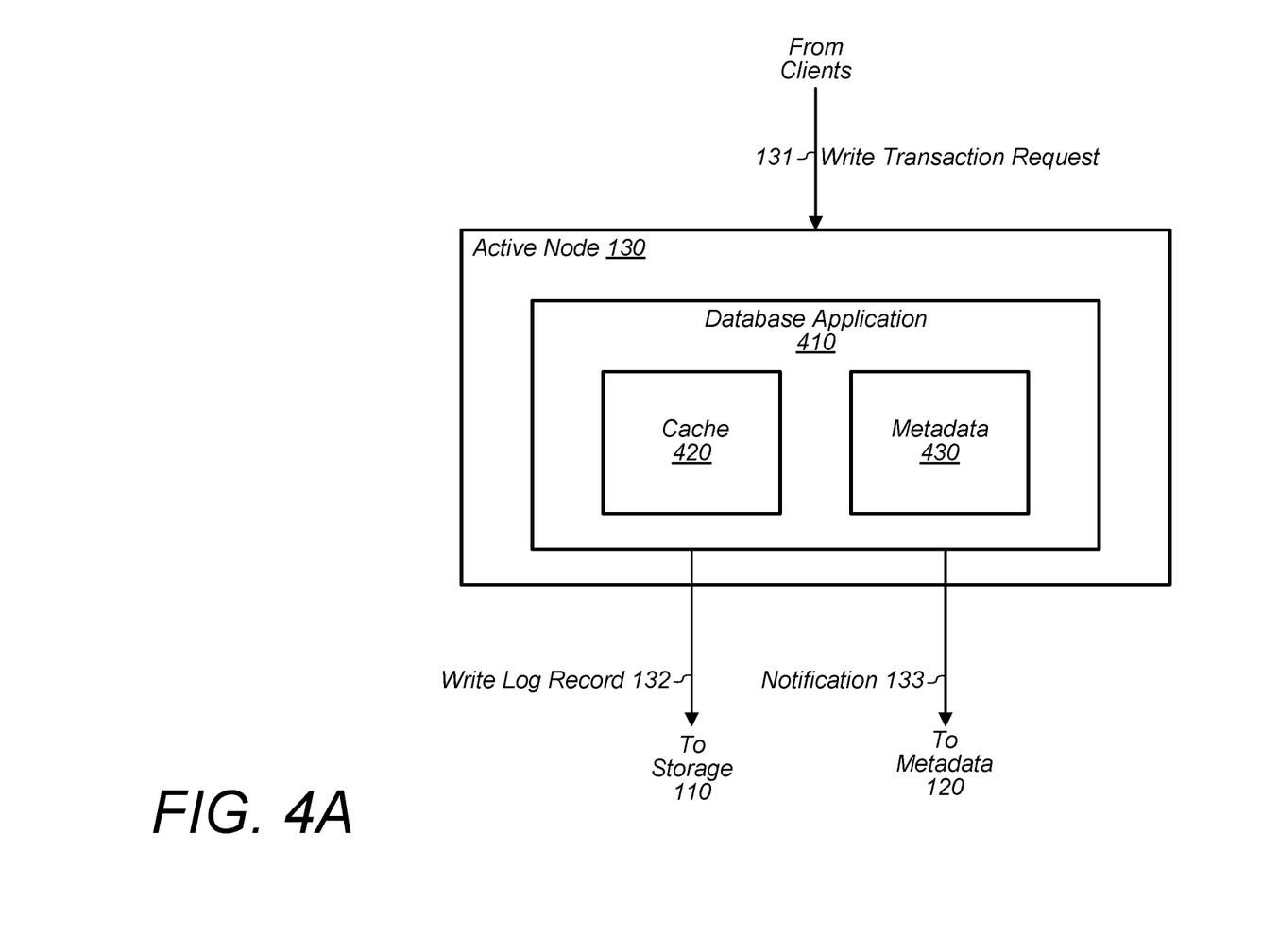
FIG. 4A is a block diagram illustrating exemplary elements of active node that service requests for writing data to a distributed storage, according to some embodiments.

Turning now to FIG. 4A, a block diagram of one embodiment of an active node 130 is shown. As mentioned above, in various embodiments, active node 130 is configured to service transaction requests 131 and 141 to read and write data to storage 110. In the illustrated embodiment, active node 130 includes a database application 410, a cache 420, and metadata 430. In some embodiments, active node 130 is implemented differently than shown.

Database application 410, in various embodiments, is a software routine, hardware, or a combination thereof that is configured to implement a high availability (HA) database. As discussed above, nodes 130 and 140 may be configured to operate in a database cluster and thus application 410 may be distributed across nodes 130 and 140 such that application 410 may operate at both a database level and a local level. In various embodiments, for example, nodes 130 and 140 may jointly hold an election to determine which node will become the next active node 130. This election may occur because application 410 may operate a database level having a view of all the nodes and their health. Locally, active node 130 may execute application 410 to service transaction requests 131 and 141 from client devices. To process such transactions, in one embodiment, application 410 maintains a current state of the database by storing data and metadata in cache 420 and metadata 430, respectively. Metadata 430 may include append point 212, tail 214, database schemas associated with currently stored data, remaining storage capacity of the current log record 115 indicated by append point 212, time stamps, processed transactions, transactions to be processed, etc.

Cache 420, in various embodiments, is configured to store data in cache lines for servicing read requests and/or buffering data for committing transactions until the data can be stored in storage 110. In some embodiments, cache 420 implements a set-associative caching scheme in which cache 420 is configured to store values in association with keys. For example, cache 420 may store data as a key-value pair where the key may be an address location of record and the value may be the value stored in the record. When a request is received to store or retrieve a value, cache 420 may use a key to select a particular cache line/entry for storing the value or retrieving from therein. Active node 130, in various embodiments, operates on data at cache 420 before writing the data to records 115 in distributed storage 110.

When node 130 receives a write transaction request 131, in some embodiments, active node 130 determines whether to allocate a new record 115 in distributed storage 110—e.g., determining based on the remaining storage capacity of the current log record 115. When a new record 115 needs to be allocated, active node 130 may allocate the new record 115 at distributed storage 110. Once a record 115 is available for writing, in various embodiments, active node 130 commit/write the transaction to the record 115. In some cases, the transaction may include new data, previous data, and an identified record; in other cases, this information may be contained in different files but be referenced by the transaction—e.g., data records and log records 115 as discussed with respect to FIG. 2. After allocating the new record 115, in various embodiments, active node 130 notifies metadata server 120 of the record. Such a notification 133 may include a record key 310 usable to locate and access the new record 115. In some embodiments, active node 130 allocates a set of records 115 instead of a single record 115—e.g., node 130 allocates ten records.

Figure 4B:
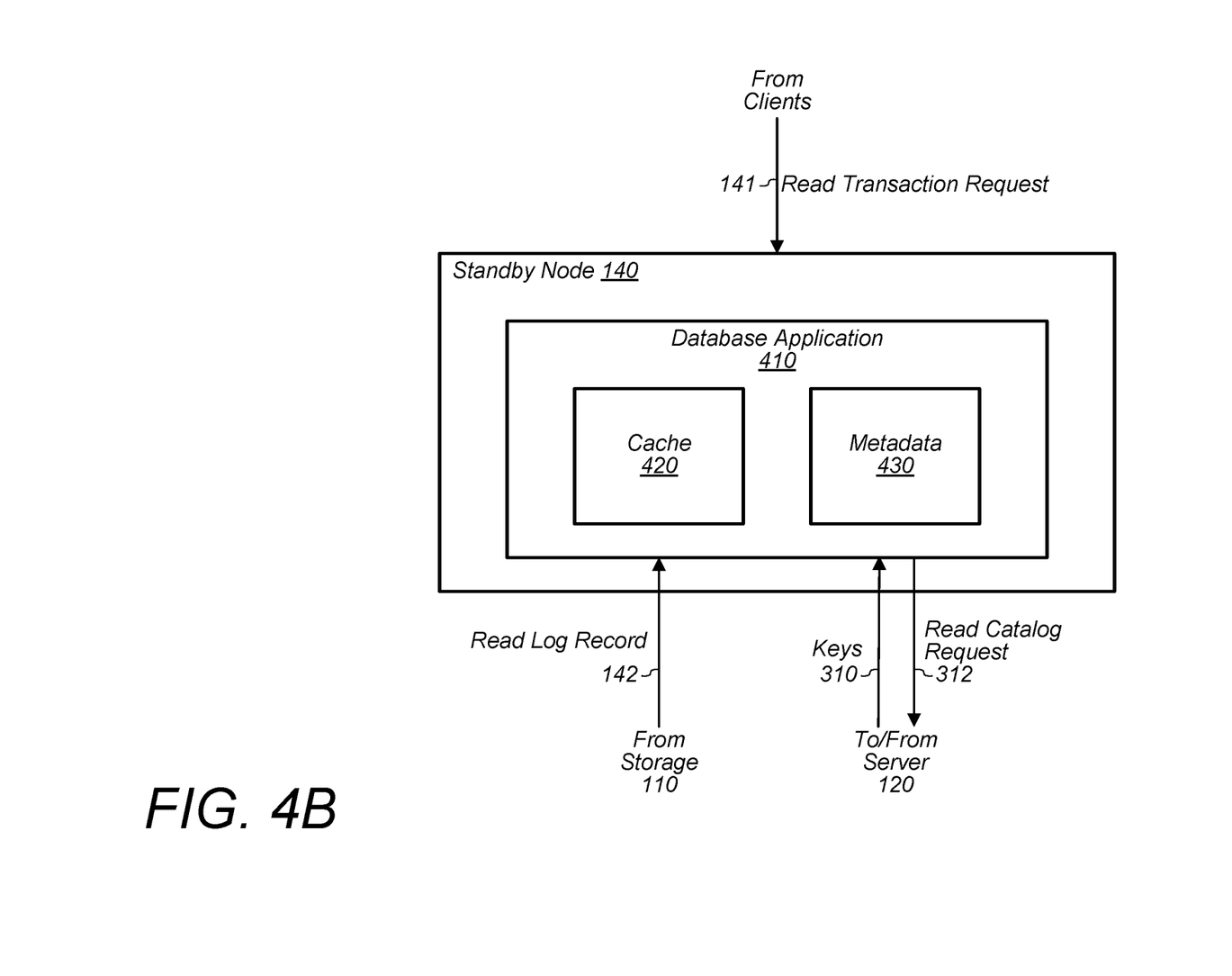
FIG. 4B is a block diagram illustrating exemplary elements of a standby node that service requests for data, according to some embodiments.

Turning now to FIG. 4B, a block diagram of one embodiment of a standby node 140 is shown. As mentioned above, in various embodiments, standby node 140 may be configured to service transaction requests 141 by providing data stored in distributed storage 110. In the illustrated embodiment, standby node 140 includes a database application 410, a cache 420, and metadata 430, which may implement functionality similar to that described with respect to FIG. 4A. In various embodiments, nodes 140 may be implemented differently than shown.

As discussed above, standby node 140, in various embodiments, maintains a current state of database system 10 by storing data from storage 110 and server 120 in cache 420 and metadata 430, respectively. Doing so may allow standby node 140 to become active node 130 and service requests 141. In order to maintain the current state of system 10, in various embodiments, standby node 140 monitors catalog 125 for any new records 115 that have been allocated by active node 130. For example, standby node 140 may compare records 115 indicated by catalog 125 against a list of processed records 115 (in some cases, log extents) included in metadata 430. In other cases, standby nodes 140 may be notified of any new records 115 added to catalog 125. After determining that a new record 115 exists, standby node 140 may send, to server 120, a read catalog request 312 for a key 310 corresponding to the new record 115 (or log extent). Using the received key 310, standby node 140 may read the new record 115 in log 112 to determine whether a value stored locally in cache 420 has been altered by node 130. Such a determination may be based on a key in the new record 115 that corresponds to a key used to index the corresponding value in cache 420. Standby node 140 may update the entry of cache 420 that stores the outdated value. In some embodiments, node 140 updates the entry by replacing the outdated value with the modified value; in other embodiments, nodes 140 updates the entry by invalidating it, causing node 140 to retrieve the modified value from storage 110 in a subsequent request 141, for example.

Figure 5:
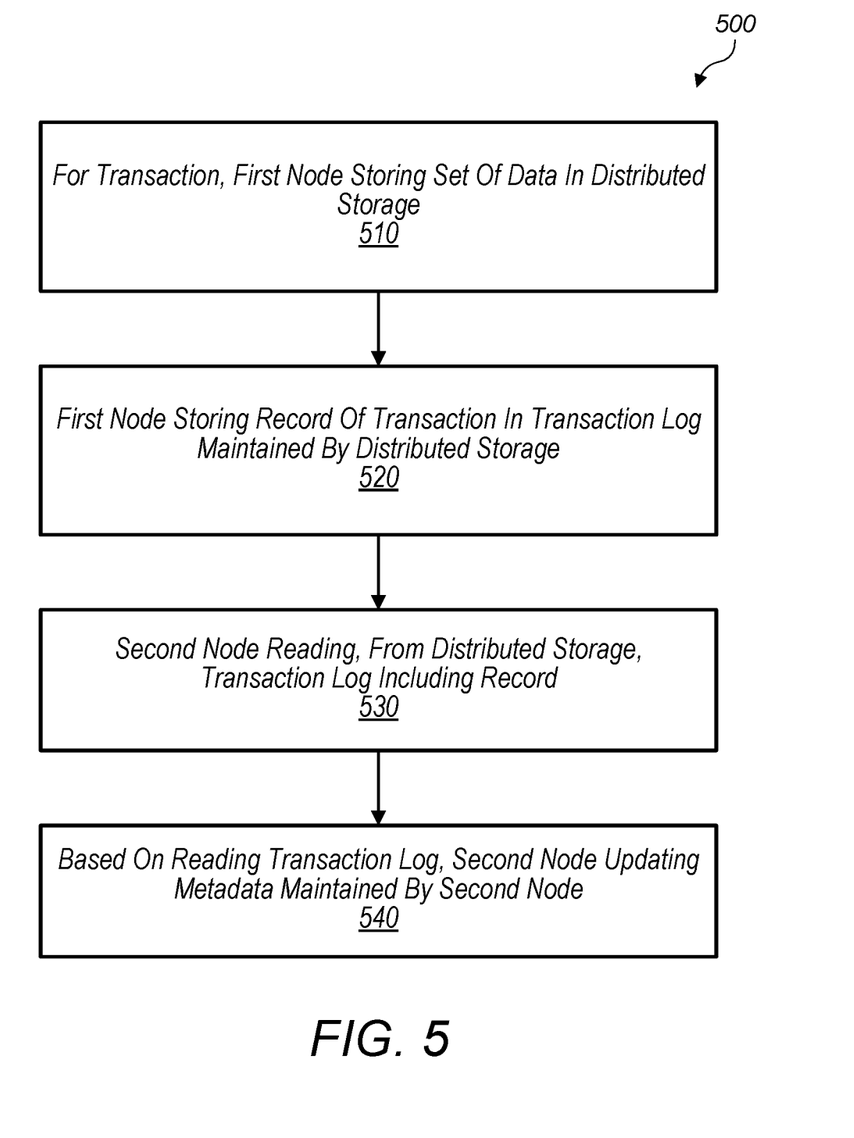
FIGS. 5-7 are flow diagrams illustrating exemplary methods relating to maintaining data coherency across nodes, according to some embodiments.

Turning now to FIG. 5, a flow diagram of a method 500 is shown. Method 500 is one embodiment of a method performed by a database system (e.g., system 10) to maintain data coherency across nodes (e.g., nodes 130 and 140) of the database system. In various embodiments, method 500 includes additional steps—e.g., selecting only one of the nodes to operate as an active node (e.g., node 130) of the system at a given time, implementing a high availability (HA) cluster, etc.

Method 500 begins in step 510 with a first node (e.g., node 130) storing, for a transaction, a set of data in a distributed storage (e.g., storage 110). In step 520, the first node stores a record (e.g., record 115) of the transaction in a transaction log (e.g., log 112) that is maintained by the distributed storage. In various embodiments, the transaction log defines an ordering in which transactions are performed with respect to the database. In various embodiments, a metadata server (e.g., server 120) of the database system maintains a catalog (e.g., catalog 125) identifying records in the distributed storage. The first node may notify the metadata server that the record of the transaction has been stored.

In step 530, a second node (e.g., node 140) reads, from the distributed storage, the transaction log that includes the record. In step 540, the second node updates metadata (e.g., cache 420 and metadata 430) maintained by the second node based on reading the transaction log. The metadata may be indicative of a current state of the database. In various embodiments, the second node accesses the catalog to identify records added to the transaction log by the first node. As such, the second node may read the added records from the distributed storage and update its metadata based on the read records. In various embodiments, the second node receives a request to perform another transaction that includes writing a set of data. Accordingly, the second node stores the set of data in the distributed storage along with a record of the transaction in the transaction log. In some embodiments, the second node maintains a cache (e.g., 420) that includes entries that maintain data that is also stored in the distributed storage. In some cases, the second node updates the metadata by invalidating an entry in the cache in response to the record indicating that data in the entry has been replaced by the set of data.

Figure 6:
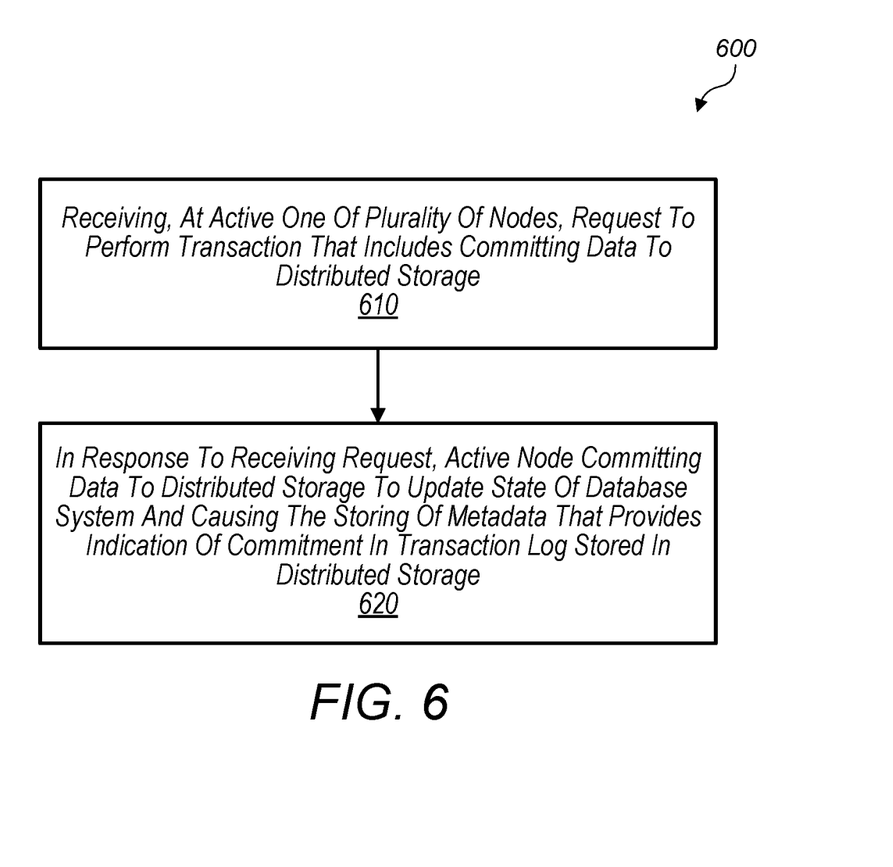

Turning now to FIG. 6, a flow diagram of a method 600 is shown. Method 600 is one embodiment of a method performed by a database system (e.g., database system 10) to synchronize a current state of the database system among a plurality of nodes (e.g., nodes 130 and 140) configured to handle requests for data of the database system stored in a distributed storage (e.g., storage 110). In some embodiments, one of the plurality of nodes is currently active and the other nodes are currently standby nodes.

Method 600 begins in step 610 with an active node (e.g., node 130) receiving a request (e.g., request 131) to perform a transaction that includes committing data to a distributed storage. In response to receiving the request, in step 620, the active node commits the data to the distributed storage to update the state of the database system and causes the storing of metadata providing an indication (e.g., record 115) of the commitment in a transaction log (e.g., log 112) in the distributed storage. In some embodiments, the transaction log identifies, to standby nodes, information for the standby nodes to know the current state of the database. In various embodiments, the database system maintains a catalog (e.g., catalog 125) that is shared among the nodes. In various embodiments, the catalog identifies metadata stored in the distributed storage and is usable by standby nodes (e.g., nodes 140) to locate the metadata stored in the distributed storage. In response to causing the storing of the metadata, the active node may update the catalog to identify the metadata. In various embodiments, the active node writes the data to data records that are stored externally to the transaction log in the distributed storage.

In some embodiments, a standby node receives a notification that the transaction log has been modified. The standby node may receive the notification in response to the active node updating the catalog to identify the metadata. In response to receiving the notification, in some embodiments, the standby node updates metadata (e.g., cache 420 and metadata 430) maintained at the standby node for servicing client requests (e.g., request 141). In some embodiments, standby node updates its metadata based on reading the metadata associated with the transaction. The standby node, in various embodiments, includes a cache that stores data of the distributed storage. As such, the standby node may retrieve, from the transaction log, a key of a key-value pair associated with the transaction. Accordingly, the standby node may identify an entry in the cache associated with the key and update the entry with a value corresponding to the key of the key-value pair. In some embodiments, in response to the standby node becoming a new active node, the new active node commits data to the distributed storage for another transaction and causes the storing of metadata that provides an indication of this other transaction in the transaction log.

In some embodiments, method 600 includes additional steps—e.g., executing a high availability (HA) application (e.g., application 410) operable to enable a standby node (e.g., node 140) to become an active node (e.g., node 130), electing only one of the plurality of nodes as an active node of the database system, maintaining a mapping associating keys of indications (e.g., records 115) in the transaction log (e.g., log 112) with physical locations in the distributed storage where the indications are stored, etc.

Figure 7:
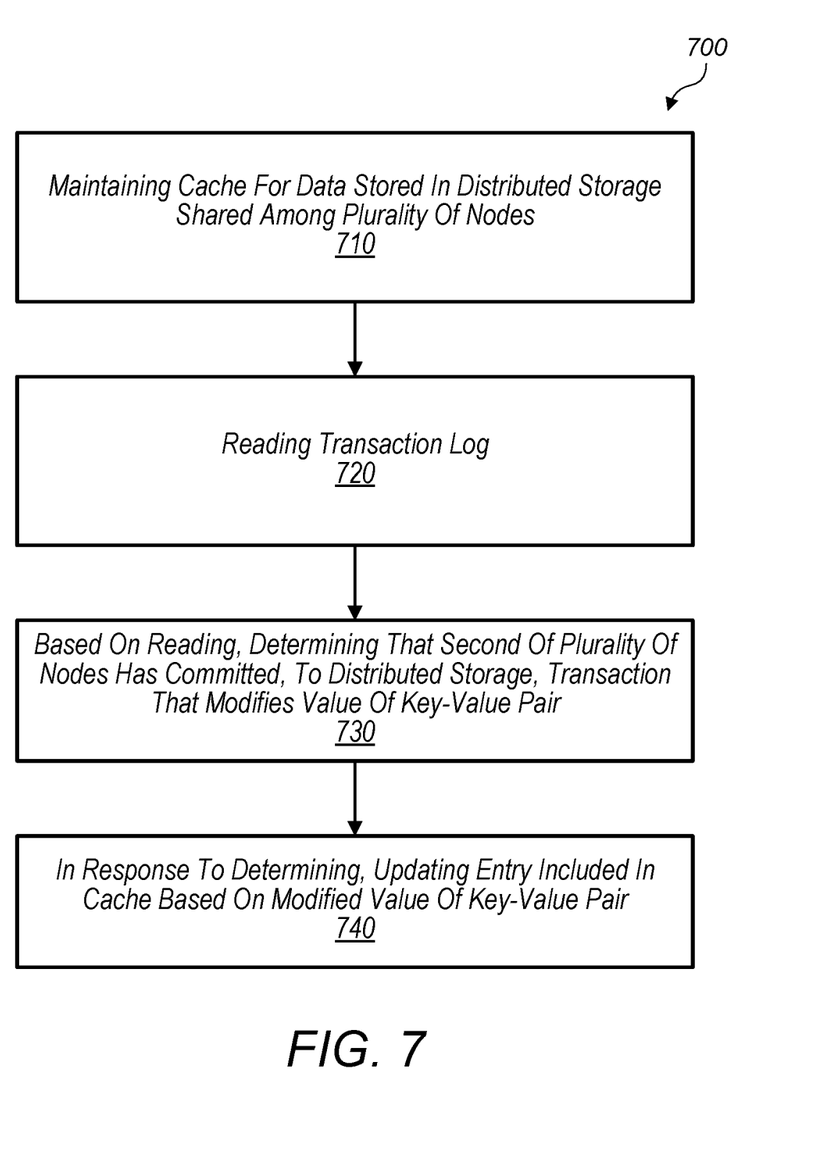

Turning now to FIG. 7, a flow diagram of a method 700 is shown. Method 700 is one embodiments of a method performed by a database node (e.g., node 140) to maintain data coherency with other database nodes.

Method 700 begins in step 710 with a database node (e.g., node 140) maintaining a cache (e.g., cache 420) for data stored in a distributed storage (e.g., storage 110) shared among a plurality of nodes (e.g., nodes 130 and 140). In various embodiments, the cache includes an entry for a key-value pair. In step 720, the database node reads a transaction log (e.g., log 112) that identifies an ordering in which transactions of the database system (e.g., system 10) are committed to the distributed storage. In various embodiments, the database node monitors a catalog of the database system that identifies new transactions that have been committed to the transaction log. The catalog may store database schemas for the database system. Prior to reading the transaction log, in some embodiments, the database node determines that the catalog identifies that a new transaction committed to the transaction log.

Based on the reading, in step 720, the database node determines that another node (e.g., node 130) has committed, to the distributed storage, a transaction that modifies a value of the key-value pair. In response to this determining, in step 730, the database node updates the entry included in the cache based on the modified value of the key-value pair. In some embodiments, the database node replaces the value in the entry with the modified value of the key-value pair; in other embodiments, the node invalidates the entry included in the cache. After being instructed to process requests for writing data to the distributed storage, in various embodiments, the database node receives, from a client device, a request to modify a value associated with another key-value pair in the distributed storage. As such, the database node may store, at the distributed storage, a transaction that specifies a modification to the value in accordance with the request and update the catalog to identify the transaction. In various embodiments, method 700 includes additional steps—e.g., receiving a request for a value corresponding to a key of a key-value pair, providing the value to a client device, etc.

Exemplary Computer System

Figure 8:
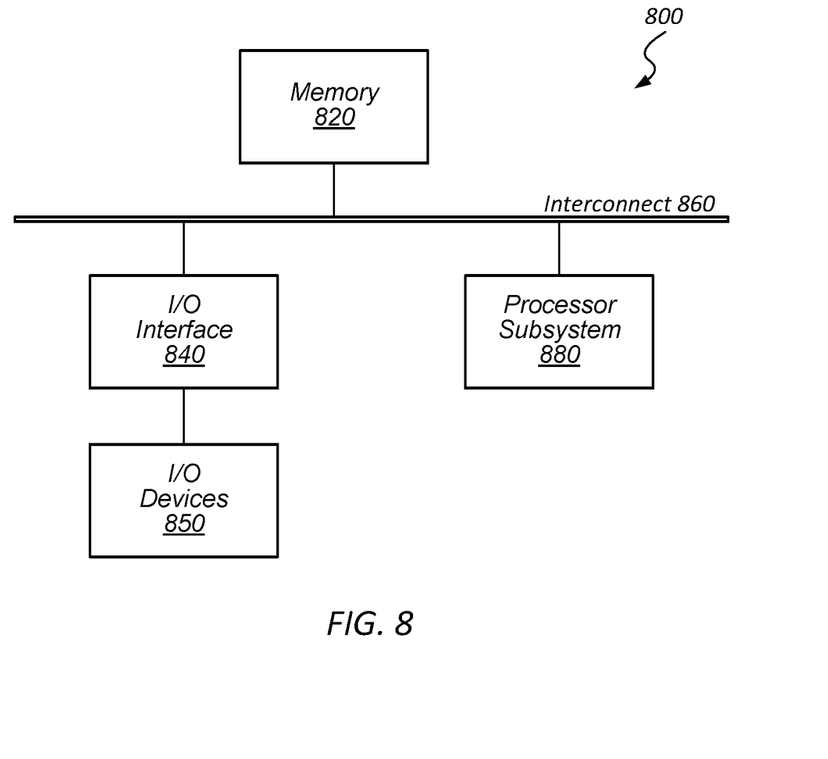
FIG. 8 is a block diagram illustrating an exemplary computer system, according to some embodiments.

Turning now to FIG. 8, a block diagram of an exemplary computer system 800, which may implement distributed storage 110, metadata server 120, active node 130, or standby nodes 140 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, cache 420 and metadata 430 described above may include (or be included within) system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for a database system synchronizing a current state of the database system among a plurality of database nodes operable to handle requests for data that is stored in a shared storage that is separate from but shared among the plurality of database nodes, with one of the plurality of database nodes being a currently active database node and the other database nodes of the plurality of database nodes being currently standby database nodes, the method comprising:

causing, by the active database node, a log extent to be allocated at the shared storage, wherein the log extent is capable of storing log records of a transaction log that identifies an ordering in which transactions of the database system are committed;

writing, by the active database node, a set of data records to the shared storage for a first transaction to update the current state of the database system;

writing, by the active database node to the log extent, a log record that includes metadata about the first transaction, including an indication of a commitment of the first transaction; and causing, by the active database node, a catalog maintained by a metadata server separate from the active database node to be updated to identify the log extent, wherein the catalog enables the standby database nodes to locate the log extent that includes the metadata in order to update data stored at the standby database nodes to be reflective of the current state of the database system, wherein the updating of the catalog causes the metadata server to send a notification to the standby database nodes that the log extent has been allocated.

2. The method of claim 1, further comprising:
in response to receiving the notification, updating, by one of the standby database nodes, data maintained at the standby database node to service client requests, wherein the updating includes reading the log record from the log extent.

3. The method of claim 1, wherein one of the standby database nodes includes a cache that stores data, and wherein the method further comprises:
retrieving, from the transaction log by the standby database node, a key of a key-value pair associated with the first transaction;
identifying, by the standby database node, an entry in the cache associated with the key; and
updating, by the standby database node, the entry with a value corresponding to the key of the key-value pair.

4. The method of claim 1, wherein the set of data records written for the first transaction is stored separately from the log record in the shared storage.

5. The method of claim 1, wherein the plurality of database nodes are configured to execute a high availability (HA) application that is operable to enable one of the standby database nodes to become a new active database node, and wherein the method further comprises:
in response to the standby database node becoming the new active database node:
committing, by the new active database node, data to the shared storage for a second transaction; and
modifying, by the new active database node, the transaction log to include another log record that includes metadata about the second transaction, including an indication of a commitment of the second transaction.

6. The method of claim 1, further comprising:
maintaining, by the shared storage, a mapping associating keys of log records with physical locations in the shared storage where the log records are stored.

7. The method of claim 1, wherein the catalog includes database keys that are usable by ones of the plurality of database nodes to access the transaction log.

8. A database system, comprising:
a plurality of database nodes configured to implement a database;
a shared storage that is separate from but shared among the plurality of database nodes and configured to store data of the database; and
a metadata server separate from the plurality of database nodes and configured to store a catalog that enables the plurality of database nodes to locate log records stored at the shared storage;
wherein a first of the plurality of database nodes is configured to:
cause a log extent to be allocated at the shared storage, wherein the log extent is capable of storing log records of a transaction log that defines an ordering in which transactions are committed;
for a first transaction, store a first set of data records at the shared storage; and
store a log record for the first transaction in the log extent at the shared storage, wherein the log record includes metadata about the first transaction, including an indication of a commitment of the first transaction; and
cause the catalog to be updated to identify the log extent, wherein the updating of the catalog causes the metadata server to send a notification to ones of the plurality of database nodes that the transaction log has been modified; and
wherein a second of the plurality of database nodes is configured to:
in response to receiving the notification, read, from the shared storage, the log record; and
based on reading the log record, update data stored by the second database node to be reflective of a current state of the database system.

9. The database system of claim 8, wherein the second database node is configured to:
access the catalog to identify log records added to the transaction log by the first database node;
read the added log records from the shared storage; and
update the data stored by the second database node based on the read log records.

10. The database system of claim 8, wherein the second database node is configured to:
maintain a cache at the second database node, wherein the cache includes entries maintaining data that is also stored at the shared storage; and
wherein updating the data stored by the second database node includes the second database node invalidating an entry in the cache in response to the log record indicating that data in the entry has been replaced by the first set of data records.

11. The database system of claim 8, wherein the second database node is configured to:
receive a request to perform a second transaction that includes writing a second set of data records;
in response to the request:
store the second set of data records at the shared storage; and
store a log record for the second transaction in the transaction log maintained at the shared storage.

12. The database system of claim 8, wherein the database system is configured to select only one of the plurality of database nodes to operate as an active database node of the database system at a given time.

13. The database system of claim 8, wherein the plurality of database nodes are configured to implement a high availability (HA) cluster, and wherein the shared storage includes a plurality of storage devices that are coupled to the plurality of database nodes via a network.

14. A non-transitory, computer-readable medium having program instructions stored thereon that are capable of causing a first database node of a plurality of database nodes of a database system to perform operations comprising:
maintaining a cache for storing data that is also stored at a shared storage separate from but shared among the plurality of database nodes, wherein the cache includes an entry for a first key-value pair;
receiving, from a metadata server that is separate from the plurality of database nodes, a notification that a transaction log has been modified by a second database node of the plurality of database nodes, wherein the transaction log is stored at the shared storage and includes a log record having metadata about a first transaction, including an indication of a commitment of the first transaction;

in response to receiving the notification, accessing, from the metadata server, a catalog that enables log records of the transaction log to be located at the shared storage;

reading the transaction log, wherein the transaction log identifies an ordering in which transactions of the database system are committed to the shared storage;

based on the reading, determining that the second database node has stored, at the shared storage, a modified value of the first key-value pair; and in response to the determining, updating the entry included in the cache based on the modified value of the first key-value pair.

15. The computer-readable medium of claim 14, wherein the operations further comprise:

receiving, from a client device, a request to perform a second transaction that includes modifying a value of a second key-value pair in the shared storage;

storing, at the shared storage, the modified value of the second key-value pair and a log record of the second transaction, wherein the log record specifies a modification to the value of the second key-value pair; and updating the catalog to identify the log record of the second transaction, wherein the catalog includes a database schema for the database system.

16. The computer-readable medium of claim 14, wherein the updating includes replacing a value in the entry with the modified value of the first key-value pair.

17. The computer-readable medium of claim 14, wherein the updating includes invalidating the entry included in the cache.

18. The computer-readable medium of claim 14, wherein the operations further comprise:

receiving, from a client device, a request for a value corresponding to a key of the first key-value pair; and in response to determining that the value is stored by the updated entry, providing the value from the updated entry to the client device.

\* \* \* \* \*